United States Patent
Siebers et al.

(10) Patent No.: US 7,981,823 B2
(45) Date of Patent: Jul. 19, 2011

(54) TRANSPARENT GLASS CERAMIC PLATE THAT HAS AN OPAQUE, COLORED BOTTOM COATING OVER THE ENTIRE SURFACE OR OVER PART OF THE SURFACE

(75) Inventors: Friedrich Siebers, Nierstein (DE); Ulrich Schiffner, Mainz (DE); Wolfgang Schmidbauer, Mainz (DE); Klaus Schönberger, Mainz (DE); Petra Grewer, Wiesbaden (DE); Erich Rodek, Mainz (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 12/540,881

(22) Filed: Aug. 13, 2009

(65) Prior Publication Data

US 2010/0130342 A1 May 27, 2010

Related U.S. Application Data

(62) Division of application No. 11/688,099, filed on Mar. 19, 2007, now abandoned.

(30) Foreign Application Priority Data

Mar. 20, 2006 (EP) .................................. 06005598

(51) Int. Cl.
*C03C 10/12* (2006.01)
*C03C 10/14* (2006.01)
*C03C 3/095* (2006.01)
*C03C 3/083* (2006.01)
*B32B 17/06* (2006.01)
*B32B 15/00* (2006.01)

(52) U.S. Cl. .................... 501/7; 501/4; 501/64; 501/68; 428/428; 428/432

(58) Field of Classification Search .................... 501/64, 501/66, 68, 4, 7; 428/426, 428, 432
See application file for complete search history.

(56) References Cited

U.S. PATENT DOCUMENTS

| 4,018,612 A | 4/1977 | Chyung et al. |
| 4,093,468 A * | 6/1978 | Boitel et al. ..................... 501/4 |
| 6,846,760 B2 * | 1/2005 | Siebers et al. .................. 501/32 |

(Continued)

FOREIGN PATENT DOCUMENTS

DE 100 17 701 A1 10/2001

(Continued)

*Primary Examiner* — Jerry Lorengo
*Assistant Examiner* — Noah S Wiese
(74) *Attorney, Agent, or Firm* — MIllen, White, Zelano & Branigan, P.C.

(57) ABSTRACT

A transparent, colorless lithium-aluminosilicate glass ceramic plate with high-quartz mixed crystals as the prevailing crystal phase, which is provided on one side with an opaque, colored, temperature-stable coating over the entire surface or over the entire surface to a large extent, is described, which has a content of $Nd_2O_3$ of 40 to 4000 ppm, a Yellowness Index of less than 10% with a 4 mm glass (ceramic) layer thickness, and a variegation of colors of the glass or the glass ceramic in the CIELAB color system of C* of less than 5. The glass ceramic plate preferably has a composition (in % by weight based on oxide) of: $Li_2O$ 3.0-4.5, $Na_2O$ 0-1.5, $K_2O$ 0-1.5, $\Sigma Na_2O+K_2O$ 0.2-2.0, $MgO$ 0-2.0, $CaO$ 0-1.5, $SrO$ 0-1.5, $BaO$ 0-2.5, $ZnO$ 0-2.5, $B_2O_3$ 0-1.0, $Al_2O_3$ 19-25, $SiO_2$ 55-69, $TiO_2$ 1-3, $ZrO_2$ 1-2.5, $SnO_2$ 0-0.4, $\Sigma SnO_2+TiO_2 <3$, $P_2O_5$ 0-3.0, $Nd_2O_3$ 0.01-0.4, $CoO$ 0.0-0.004.

8 Claims, 2 Drawing Sheets

Transmission Spectra of the Glass Ceramic of Example 8 and 9

| U.S. PATENT DOCUMENTS | | | | FOREIGN PATENT DOCUMENTS | | |
|---|---|---|---|---|---|---|
| 7,141,521 B2 | 11/2006 | Siebers | | FR | 2 405 906 | 5/1979 |
| 2002/0018575 A1 | 2/2002 | Bream | | GB | 1070124 | 5/1967 |
| 2002/0023463 A1 | 2/2002 | Siebers et al. | | GB | 1 562 332 | 3/1980 |
| 2002/0058117 A1 | 5/2002 | Schultheis et al. | | WO | 01/72086 A | 9/2001 |
| 2005/0143246 A1 | 6/2005 | Comte et al. | | WO | 2008/065166 | 6/2008 |
| 2005/0250639 A1 | 11/2005 | Siebers | | WO | 2008/065167 | 6/2008 |
| 2007/0259767 A1 | 11/2007 | Siebers et al. | | | | |
| 2009/0018007 A1 | 1/2009 | Siebers et al. | | | | |

* cited by examiner

Color Coordinates of the Glass Ceramics, Examples 11 to 20, According to the Invention, and the Comparison Glass Ceramics

TRANSPARENT GLASS CERAMIC PLATE THAT HAS AN OPAQUE, COLORED BOTTOM COATING OVER THE ENTIRE SURFACE OR OVER PART OF THE SURFACE

This application is a divisional of U.S. patent application Ser. No. 11/688,099, filed on Mar. 19, 2007, which is abandoned.

The invention relates to a transparent glass ceramic plate with high-quartz mixed crystals as the prevailing crystal phase, which is exposed to operationally high thermal stresses and which has an opaque, colored, high-temperature-stable bottom coating over the entire surface or over part of the surface.

In terms of this invention, glass ceramic plates are to be defined as not only flat, smooth plates, but also plates that are deformed three-dimensionally, such as, e.g., beveled, angled or curved plates. In this case, the plates can be designed rectangular or round or can also have another shape. Such glass ceramic plates have a very low thermal expansion coefficient in the temperature range between room temperature up to 700° C. of usually $\alpha_{20/700}<1.5 \cdot 10^{-6}$/K and thus high temperature resistance and temperature gradient strength. They are used in transparent form, e.g., as fire protection glass, fireplace door windows and cooking surfaces.

Stove tops with a glass ceramic plate as a cooking surface are current prior art.

To prevent an unsettling view of the technical elements under the glass ceramic cooking surface and to avoid the shielding action caused by radiating heating elements, the glass ceramic cooking surfaces are reduced in their light transmission to values of about 0.5 to 10%. This can take place, on the one hand, by additions of coloring elements by absorption, as is described in, for example, EP 220333. These glass ceramic cooking surfaces then appear black when viewed from above and red-violet or orange-brown when looking through depending on the coloring elements that are used.

In glass ceramic cooking surfaces with keatite crystals as the prevailing crystal phase, the required light transmission with light scattering on the enlarged crystallites can be adjusted, as is described in EP 1 170 264. A basic drawback of these two types of glass ceramic cooking surfaces exists in their limited display capacity. The tinting of the glass ceramic cooking surface with absorbing elements results in that displays are possible only with certain colors, in most cases with the color red. The reduction of the light transmission by light scattering results in that the displays no longer appear sharp and produce unsettling haloes.

Another application of the glass ceramic panes exists in the use as, e.g., fireplace door windows. For this purpose, the panes must be transparent. For manufacturing purposes, it is advantageous if panes of the same composition could be used for these two applications.

A comparatively new technical approach for the production of cooking surfaces consists in making transparent glass ceramic plates optically non-transparent by an opaque, colored bottom coating. The bottom coating is optionally partially interrupted by providing optically transparent areas for displays, e.g., LED or LCD displays of residual heat in the cooking zones. Also, color or black-white screen displays, e.g., for showing cooking recipes or for interactive functions (Internet, integration with other household appliances, control electronics) can be integrated under the optically transparent areas.

Transparent, non-colored stove tops, which are provided with a bottom coating, are known from, e.g., U.S. Pat. No. 6,914,223 B2, US 2005/0129959 A1 or U.S. Pat. No. 6,660,989 B2. The type and structure of the bottom coating can be designed differently in the colder and hotter areas, e.g., in the cooking zones of the cooking surfaces.

As paints that meet the specifications for these bottom coatings, in particular luster paints, organic-based paints, glass-flux-based decorative paints with coloring pigments and colored or pigmented sol-gel layers are mentioned. As pigments, conventional inorganic pigments, luster pigments, metal effect pigments or pearlescent interference pigments and various mixtures of these pigments are used.

So that the color of the bottom coating is not altered by the transparent glass ceramic plate, it is advantageous if the latter has a low inherent color. Since the irradiating light passes through the glass ceramic plate before it falls on the colored coating to be partially absorbed and reflected on the latter, before it then passes back again through the glass ceramic plate and reaches the observer, a weak inherent color of the transparent glass ceramic plate also has a disruptive effect. The advantages of a transparent glass ceramic plate with low inherent color are found in the prior art.

Thus, e.g., U.S. Pat. No. 6,660,980 B2 describes the use of a transparent glass ceramic as a substrate for the bottom coating. The usual slightly brownish-yellow inherent coloring of the latter and other glass ceramic plates used was perforce previously accepted.

In Column 6, paragraph 3, U.S. Pat. No. 6,914,223 B2 describes how a new color shade is set by superposition of the colors of the bottom coating with the brownish-yellow inherent coloring of the glass ceramic plate. It is disadvantageous that the recognizable inherent color of the transparent glass ceramic plate depends on the thickness thereof. In addition, certain pure color shades, e.g., white or silver-metallic, cannot be produced for the observer without an unsettling brown-yellow color hue. In the development of a color palette of various colored bottom coatings, it is necessary always to consider the inherent color of the transparent glass ceramic plates. For the observer, this inherent color is, however, as explained, dependent on the thickness of the glass ceramic plates and can also vary by process-induced fluctuations (raw material contamination, melt conditions, glazing). For the above-mentioned reasons, an effort is therefore to be made to set the inherent color in the transparent glass ceramic plate to as low a value as possible.

The inherent color of transparent glass ceramic plates can have various causes. Also, the use of the refining agent $Sb_2O_3$ results in a low inherent color. The described brownish-yellow inherent coloring of the transparent glass ceramics is based on electronic transitions to color complexes that absorb in the area of the visible light and on which the component—the Ti ion—that is necessary for the nucleation is involved. The most frequently absorbing color complex is the formation of adjacent Fe and Ti ions, between which electronic charge-transfer transitions take place. The formation of these adjacent complexes takes place as early as during cooling of the starting glass and in particular during later glazing of the glass ceramics. By preferred stratification of the ions involved in the charge transfer during glazing, the inherent color is thus quite considerably enhanced compared to the starting glass.

In the production of glass ceramic plates with the addition of $SnO_2$ as a nucleating agent or refining agent, it has been shown that with glazing, an additional disruptive color complex occurs. This color complex is based on Sn/Ti color complexes, which also absorb in the short- to middle-wave portion of the visible spectrum. In the starting glasses, this color complex is less well formed; after glazing, it results in a very disruptive yellow-brown coloring in the transparent glass ceramic.

For transparent glass ceramics without colored coating, various approaches are known to reduce the disruptive inherent color that is based on the Fe/Ti color complex. One approach is the reduction of the iron content that is present as a contaminant.

The reduction of the Fe content is a measure that is economically usable only to a certain extent, however. A certain amount of $Fe_2O_3$ always develops through the industrially available raw materials of the batch for the production and homogenization of the batch. Based on the costs for extremely pure raw materials and for special plant design measures, it is economically no longer justifiable to reduce the $Fe_2O_3$ content below about 50 ppm in transparent glass ceramics. The $Fe_2O_3$ content is usually on the order of magnitude of about 150 to 500 ppm.

U.S. Pat. No. 4,438,210 describes approaches for reducing the Fe/Ti color complex. Here, transparent glass ceramics with low inherent color are obtained, which acquire 2-6% by weight of $TiO_2$ and 0-2% by weight of $ZrO_2$ as a nucleating agent and up to about 0.1% by weight of $Fe_2O_3$ as a contaminant because the component MgO is essentially omitted.

The replacement of the nucleating agent $TiO_2$ is described in 03-23237 A. These glass ceramics forego the addition of $TiO_2$ as a nucleating agent and are based on mixed nucleation by $ZrO_2/SnO_2$. The $SnO_2$ contents that are necessary for this purpose are more than 1% by weight. In the case of these high $SnO_2$ contents, however, the devitrification resistance of the glass deteriorates in the area of shaping in viscosities around the processing temperature $V_A$ of $10^4$ dPas. During shaping, which is carried out in glass ceramic plates usually with an upper roller and a lower roller, disruptive Sn- and/or Zr-containing crystal phases crystallize out. It thus results in an unreliable reduction of the resistance of the glass plates and the glass ceramic plates that are produced therefrom.

To avoid a disruptive light scattering (turbidity) of the transparent glass ceramic plate, however, certain minimum contents of the nucleating agents $ZrO_2$, $TiO_2$ and optionally $SnO_2$ are necessary. Thus, it is ensured that even in the short glazing times that are desired for manufacturing technology, sufficient nuclei are formed, and the growing high-quartz mixed crystals remain small enough not to result in a disruptive light scattering. The light scattering can be determined visually on glass ceramic plates or quantitatively by measuring the turbidity (English: haze) according to ASTM D 1003. Since the contents of the nucleating agents $ZrO_2$ and $SnO_2$ are limited because of the devitrification during shaping, a minimum content of the nucleating agent $TiO_2$ is necessary in the current prior art to ensure the devitrification resistance during shaping of glass plates.

From the glass technology, it is also known to neutralize an undesirable color hue, which is produced by a contamination of the gas with a coloring element, by the addition of a coloring element with a complementary color. The addition of $MnO_2$ ("gaffer soap") for elimination of weak coloration caused by iron has been known since time immemorial. Also, the neutralization of the amber coloration produced by titanium and iron by neodymium oxide is known from U.S. Pat. No. 4,093,468. By the neutralization (staining over) of the disruptive color hue, it is achieved that the disruptive inherent color is altered in the direction of a neutral color shade. Neutral color shades, e.g., weak gray shades, thus are visually less obvious and disruptive. The color of the coating when looking through the transparent glass ceramic plate is not altered in color but rather is superimposed in a hardly noticeable way by a light gray hue. Since the existing absorption bands are neutralized by complementary absorption bands of the staining agent, a reduced light transmission is produced overall.

Since the use of arsenic as a refining agent is always less tolerated for known reasons, it is plained to an increasing extent with other refining agents, in particular antimony oxide and tin oxide, but also cerium dioxide. These refining agents or glass additives add additional color hues to the glass ceramic, which also have to be neutralized. In this case, however, it should not come to the point where the transmission of the glass ceramic is so greatly impaired that the neutral coloration that is produced produces a gray coloration.

Another problem develops in the recycling of the glass ceramic. As is generally known, scrap glass, e.g., container glass, such as bottles, glass containers, but also flat glass, such as window glass, is collected to a great extent and recycled in the form of cullets. If glass ceramic also finds its way into these cullets, this results in problems in the melting tanks and in the shaping process, since the glass ceramics from the $Li_2O$—$Al_2O_3$—$SiO_2$ glass system have higher melting points and thus can have a very disruptive effect during remelting of the lime-sodium glasses and the shaping thereof. The danger exists because the high-melting $Li_2O$—$Al_2O_3$—$SiO_2$ glass does not form melted remnants in the lime-sodium glasses. In the most advantageous case, this results in visually recognizable remnants in the lime-sodium glass products; in the most disadvantageous case, it can result in $Li_2O$—$Al_2O_3$—$SiO_2$ melt remnants and in the clogging of channels or nozzles in the shaping process and thus in total failure during production of lime-sodium glasses.

Even now, cullets are frequently already being separated before they are recycled by optical recognition methods after sorting, e.g., brown glass, green glass, colorless glass. These optical recognition methods separate the cullets based on their different absorption bands. It would be desirable if the glass ceramic millets could also be recognized and separated in this separation process, on the one hand, to protect the used-glass tanks and, on the other hand, also to be able to recycle the glass ceramic cullets.

The object is therefore to find a glass ceramic plate that is coated over the entire surface or over part of the surface on the back side and that does not have any of the disruptive color shade distorting the colors of the coating on the back side and that can be clearly identified in cullet sorting facilities with optical cullet recognition.

This object is achieved by the glass ceramic plate that is described in claim 1. Additional embodiments of the invention are described in the subclaims.

A glass ceramic plate that is coated on the back side in the lithium-aluminosilicate glass system with high-quartz mixed crystals as a prevailing crystal phase was found, and said plate has an $Nd_2O_3$ content of 40-4000 ppm, a Yellowness Index of less than 10% with a 4 mm plate thickness and a variegation of colors of the glass ceramic in the CIELAB color system of C* of less than 5.

The measurement of the Yellow Index takes place with standard illuminant C according to the ASTM Standard 1925/70 (77, 85). The variegation of colors (chromaticity) C* in the CIELAB system is defined by $C^* = \sqrt{a^{*2} + b^{*2}}$, whereby a* and b* are the color coordinates in this system. The color coordinates L*, a*, and b* from the CIELAB system (or, in short, lab system) can be converted in a known way into color coordinates x, y and brightness (light transmission) Y of the CIE, color system.

It was found that the neodymium addition especially readily counteracts the color hues formed by $Sb_2O_3$ refining additives and by SnTi color complexes, in addition to the color hues formed by Fe/Ti color complexes.

Additions of CO in a total amount of up to 50 ppm, preferably 0-40 ppm, in particular 0.1-40 ppm, in addition to the Nd additive, allow the color point of the transparent color ceramic plate to be set more precisely in the direction of the achromatic point. The Nd additive by itself does not shift the color point exactly in the direction of the achromatic point, such that this slight correction may be advantageous. Additional fine corrections of the color site can also be performed with other staining agents, such as, e.g., Cr, Ni, V, Cu, Mn and Ce.

The transparent glass ceramic plate according to the invention preferably has a composition in % by weight based on oxide of:

| | |
|---|---|
| $Li_2O$ | 3.0-4.5 |
| $Na_2O$ | 0-1.5 |
| $K_2O$ | 0-1.5 |
| $\Sigma Na_2O + K_2O$ | 0.2-2.0 |
| MgO | 0-2.0 |
| CaO | 0-1.5 |
| SrO | 0-1.5 |
| BaO | 0-2.5 |
| ZnO | 0-2.5 |
| $B_2O_3$ | 0-1.0 |
| $Al_2O_3$ | 19-25 |
| $SiO_2$ | 55-69 |
| $TiO_2$ | 1-3 |
| $ZrO_2$ | 1-2.5 |
| $SnO_2$ | 0-0.4 |
| $\Sigma SnO_2 + TiO_2$ | <3 |
| $P_2O_5$ | 0-3.0 |
| $Nd_2O_3$ | 0.01-0.4 |
| CoO | 0-0.004 | optionally with the additions of chemical refining agents such as $As_2O_3$, $Sb_2O_3$, and $CeO_2$ and refining additives, such as sulfate compounds, chloride compounds, and fluoride compounds in total contents of up to 2.0% by weight.

The oxides $Li_2O$, $Al_2O_3$ and $SiO_2$ are components for the formation of high-quartz and/or keatite mixed crystal phases that are necessary within the preferred limits indicated in the claims. $Li_2O$ contents of over 4.5% by weight are critical for the devitrification resistance in the production of glass ceramic plates. The $Al_2O_3$ content is at least 19% by weight and is limited—to avoid high viscosities of the glass and because of the undesirable devitrification of mullite phases during shaping—to a maximum 25% by weight, preferably 24% by weight. The $SiO_2$ content is to be 55 to a maximum of 69% by weight, preferably a maximum up to 68% by weight, since this component greatly increases the viscosity of the glass. For melting the glasses and with respect to the temperature stress during shaping, higher contents of $SiO_2$ are therefore disadvantageous.

The addition of alkalis $Na_2O$ and $K_2O$ in amounts of, in each case, up to 1.5% by weight, the alkaline-earths CaO up to 1.5% by weight, SrO up to 1.5% by weight, BaO up to 2.5% by weight and $B_2O_3$ up to 1% by weight improve the meltability and the devitrification behavior during shaping. The contents are limited, however, since these components essentially remain in the residual glass phase of the glass ceramic and increase the thermal expansion in an unreliable way. Thus, they have a disadvantageous effect on the temperature resistance of the glass ceramic plates. The sum of the alkalis $Na_2O+KO_2$ is to be at least 0.2% by weight, preferably at least 0.3% by weight.

As additional components, MgO, ZnO and $P_2O_5$ can be incorporated in the crystal phase. Because of the problem of forming undesirable crystal phases with higher thermal expansion, such as, e.g., Zn spinel during glazing, the ZnO content is limited to values of at most 2.5% by weight, preferably at most 2.0% by weight. The MgO content is limited to at most 2.0, preferably 1.5% by weight, since it otherwise unreliably increases the thermal expansion of the glass ceramic. For low inherent colors, MgO contents of less than 0.8% by weight and in particular less than 0.6% by weight are advantageous. A minimum MgO content of 0.1% by weight is generally required, so that the thermal expansion of the glass ceramic between 20° C. and 700° C. does not drop to negative values below $-0.3\times10^{-6}$/K. The addition of $P_2O_5$ can be up to 3% by weight and is preferably limited to 1.5% by weight. The addition of $P_2O_5$ is advantageous for the devitrification resistance; higher contents have a disadvantageous effect on the acid resistance.

In the information, the Nd content is converted onto an oxide base ($Nd_2O_3$), whereby the type of Nd additive in the batch is not limited to the indicated oxide, but rather any Nd compounds can be added.

The contents of the nucleating components $TiO_2$, $ZrO_2$, and $SnO_2$ are to be controlled within relatively narrow limits. Certain minimum contents are necessary to produce high density during the desired short glazing times of less than 2.5 hours, so that after the high-quartz mixed crystals are grown, transparent glass ceramics can be produced without disruptive turbidity.

For an effective nucleation, in any case a minimum content of $TiO_2$ of 1% by weight is necessary. The $TiO_2$ content is to be a maximum of 3% by weight, preferably at most 2.7% by weight, since this component is involved in the formation of Fe/Ti and Sn/Ti color complexes that disrupt the inherent color.

The content of $SnO_2$ is not to exceed 0.4% by weight, preferably 0.3% by weight, since otherwise it results in an undesirable devitrification of an Sn-containing crystal phase during shaping close to the processing temperature $V_A$ and since the Sn/Ti color complexes contribute to the inherent color.

The equivalent holds true for the content of $ZrO_2$, in which an upper limit of 2.5% by weight is to be maintained, so that not only devitrification in the form of a $ZrO_2$-containing crystal phase (baddeleyite) results. An effort is to be made to have the upper devitrification limit (OEG) be below the processing temperature $V_A$.

As chemical refining agents, the refining agents $As_2O_3$ and/or $Sb_2O_3$, which are common for glass ceramics from the $Li_2O$—$Al_2O_3$—$SiO_2$ system, can be used. These refining agents are distinguished in that they exert their refining action by releasing $O_2$. The use of the nucleating agent $SnO_2$ is especially advantageous if the latter is used in addition as a refining agent in connection with a high-temperature refining of greater than 1700° C., since $SnO_2$ cleaves the $O_2$ that is required for refining at these elevated temperatures. Additional refining agent additives, such as, e.g., sulfate compounds, chloride compounds and fluoride compounds, can be added to the glass melt. The total content of the refining agent and refining additives is not to exceed 2% by weight.

The water content of the starting glasses according to the invention is usually between 0.015 and 0.06 mol/l, depending on the selection of the raw materials of the batch and the process conditions in the melt. This corresponds to $\beta_{OH}$ values of 0.16 to 0.64 $mm^{-1}$.

According to a second further development of the invention, the glass in an especially preferred embodiment contains the following in % by weight based on oxide:

| | |
|---|---|
| $Li_2O$ | 3.2-4.3 |
| $Na_2O$ | 0.2-1.0 |
| $K_2O$ | 0-0.8 |
| $\Sigma Na_2O + K_2O$ | 0.3-1.5 |
| MgO | 0.1-1.5 |
| CaO | 0-1.0 |
| SrO | 0-1.0 |
| BaO | 0-2.5 |
| ZnO | 0-2.0 |
| $Al_2O_3$ | 19-24 |
| $SiO_2$ | 60-68 |
| $TiO_2$ | 1.0-2.7 |
| $ZrO_2$ | 1.2-2.2 |
| $SnO_2$ | 0-0.3 |
| $\Sigma SnO_2 + TiO_2$ | <2.7 |
| $P_2O_5$ | 0-1.5 |
| $Nd_2O_3$ | 200-3000 ppm |
| CoO | 0-30 ppm | optionally with the additions of chemical refining agents such as $As_2O_3$, $Sb_2O_3$, and $CeO_2$ and refining additives such as sulfate compounds, chloride compounds, and fluoride compounds in total amounts of up to 1.5% by weight.

In the case of low refining agent contents, it may be necessary to combine the chemical refining with a high-temperature refining above 1700° C. if good bubble qualities with numbers of bubbles <5 bubbles/kg of glass (relative to bubble sizes >0.1 mm) are desired.

For the inherent color, it is especially advantageous if the glass ceramic plate contains $As_2O_3$ as a refining agent, optionally with additional refining additives such as sulfate, chloride and fluoride compounds in total contents of up to 1% by weight, and is plained without the refining agents $Sb_2O_3$ and $SnO_2$.

By using 0.1-0.4% by weight of $SnO_2$ as a refining agent in combination with a high-temperature refining >1700° C., it is possible to obtain devitrification-stable starting glasses (OEG<$V_A$) with good bubble qualities.

The transparent coated glass ceramic plate according to the invention with high-quartz mixed crystals as the prevailing crystal phase is to have a thermal expansion coefficient of between room temperature and 700° C., which deviates from the zero expansion by no more than $0.5 \cdot 10^{-6}$/K. The deviation of less than $0.3 \cdot 10^{-6}$/K is to be preferred. With the low thermal expansion coefficients, a high temperature difference resistance of the glass ceramic plate is achieved.

To achieve especially good properties with respect to low inherent color and high light transmission, it is advantageous if the transparent glass ceramic plate according to the invention contains less than 2.5% by weight of $TiO_2$, less than 2000 ppm of $Nd_2O_3$ and less than 20 ppm of CoO, and the $Fe_2O_3$ content is less than 300 ppm, preferably less than 210 ppm. Thus, it is possible, with a 4 mm thickness, to achieve a light transmission of greater than 80%, preferably greater than 85%, associated with low inherent color, i.e., a Yellowness Index of less than 7% and a variegation of colors (chromaticity) in the CIELAB system C* of less than 3.5.

To avoid disruptive light scattering (turbidity) of the transparent glass ceramic plates in the production with short glazing times, certain minimum contents of the nucleating agents are necessary. The turbidity (English: haze) is to be less than 1%, preferably less than 0.5% (measured for a 3.6 mm-thick plate with a polished surface). According to ASTM D 1003, turbidity is the proportion, in percent, of the transmitted light, which deviates from the irradiated light beam on average by more than 2.5°.

Studies have shown that the nucleation action of $SnO_2$ and $TiO_2$ (in % by weight) is about the same. Therefore, these two components can be considered together. The nucleation action of the $ZrO_2$ (in % by weight) is clearly greater than that of $TiO_2$ or $SnO_2$. Therefore, the combinations of nucleating agents $ZrO_2$ and ($TiO_2+SnO_2$) can be produced with the same nucleating action, and said combinations follow a relationship. For the desired slight turbidity, there is produced—in short glazing times of less than 2.5 hours, preferably less than 100 minutes—for the minimum content of the nucleating agents:

$ZrO_2+0.87(TiO_2+SnO_2) \geq 3.65$

Additional limits are produced from the requirement for lower inherent color:

$\Sigma SnO_2+TiO_2<2.7\%$ by weight and the requirement for devitrification resistance:

$ZrO_2<2.5\%$ by weight $SnO_2<0.4\%$ by weight.

On the other side, high nucleating agent contents result in a deterioration of the devitrification behavior during shaping, as was already explained. To ensure that the upper devitrification temperature (OEG) is below the processing temperature $V_A$, an upper limit for the nucleating agent contents is produced, and said limit follows the equation:

$ZrO_2+0.87(TiO_2+SnO_2) \leq 4.3$

Similar to known glass ceramics, the glass ceramic plates according to the invention can be converted into a glass ceramic that contains keatite mixed crystals by an additional temperature treatment at temperatures of between about 900 and 1200° C. Glass ceramics of this type have a higher temperature resistance, but at the expense of an increase in the thermal expansion coefficient, which is between room temperature and 700° C. on the order of magnitude of about $1 \cdot 10^{-6}$/K. Because of the crystal growth that accompanies the conversion, they have a translucent to opaque-white appearance. The turbidity is generally >50% in haze values.

The transparent coated glass ceramic plates according to the invention are suitable especially as cooking surfaces for use in a stove top. The opaque, colored temperature-stable coatings are preferably on the side of the glass ceramic plate that is not used and thus make it possible to provide color designs and to avoid the disruptive view of the technical elements below the transparent glass ceramic plate. In this case, the cooking zones of the glass ceramic plate can be electrically radiant-heated, inductively heated or gas-heated. In particular, in the case of electric halogen heating elements, it is necessary—by the coating—also to avoid the shielding action caused by the radiating heating elements. In radiant heating, moreover, it is desirable that the bottom coating be infrared-transparent to ensure short boiling times. The most varied types and embodiments of bottom coatings are possible according to the prior art. Thus, e.g., the bottom coating can be designed differently in the hot areas and in the colder areas of the glass ceramic plate.

The top of the glass ceramic plate, which also represents the side that is used during use as a cooking surface, can be decorated with decorative paints in the usual way. The decorative embodiments can be designed to be expansive or compact and have various degrees of surface coatings. The top decoration can also be designed such that together with the colored bottom coating, it produces certain impressions or designs.

For introducing color displays or screen displays, it is advantageous if the transparent glass ceramic plate contains a bottom coating with partial recesses. Indicators, displays, etc., can be attached under these recesses, which can be detected by the recess through the glass ceramic plate. Because of the low inherent colors according to the invention, the display indicators and screens have high color fidelity. The light gray shade of the glass ceramic plate according to the invention is very advantageously produced in the displays compared to the brownish-yellow inherent color without $Nd_2O_3$ content. When used as a cooking surface, the glass ceramic plate according to the invention is especially suitable for color LED or LCD displays, and future color displays, screens and even televisions. In addition to the low inherent color, the high light transmission is also advantageous here. In this way, new functions, such as, e.g., showing cooking recipes or interactive functions (Internet, integration with other household appliances) or touch-screen control electronics can be integrated advantageously under the transparent, color-free glass ceramic plate.

The above-mentioned advantages are also used in a corresponding way in other applications, e.g., as fireplace door windows, fire protection glazings, oven door windows or in lamp covers.

This invention becomes clearer with the aid of the following examples.

The glasses of Table 1 were melted and plained with use of raw materials that are common in the glass industry at temperatures of about 1620° C. The batch was melted in crucibles that consist of sintered silica glass and then poured into the Pt/Rh crucibles with inside crucibles made of silica glass and homogenized at temperatures of about 1550° C. for 30 minutes while being stirred. After standing at 1640° C. for 2 hours, castings of about 140×100×30 mm in size were poured and depressurized in an annealing furnace at about 660° C. and cooled to room temperature. Test patterns for the measurement of the properties in the vitreous state and the plates for the glazing were prepared from the castings. In Table 1, the $Fe_2O_3$ contents produced by raw material contaminants are also cited in the compositions. The water content of the glasses is 0.03-0.05 mol/l, corresponding to $\beta_{OH}$ values of 0.32 to 0.53 $mm^{-1}$.

Table 1 shows the compositions of the starting glasses Nos. 1 to 8 according to the invention and the starting glasses 9 to 10 according to the prior art for comparison. The starting glass 10 corresponds to a composition without Nd additive that is optimized relative to inherent color. This optimization is at the expense of a higher processing temperature $V_A$ and strong negative thermal expansion α20/700 of the glass ceramic. Variegation of colors and Yellowness Index are comparatively higher values.

In Table 1, the properties in the vitreous state, such as, e.g., transformation temperature Tg, processing temperature $V_A$, upper devitrification limit OEG, thermal expansion between room temperature and 300° C., as well as the density are also cited. Based on the composition, in particular the nucleating agent content is the upper devitrification limit below the processing temperature $V_A$.

The glazing of the starting glasses was carried out with the following temperature/time programs:
Glazing Program 1, (Total Time 147 Minutes):
In 50 minutes from room temperature to 790° C.
30 minutes of holding time at 790° C.
In 30 minutes from 790 to 900° C.
7 minutes of holding time at 900° C.
In 30 minutes from 900 to 750° C.
Quick cooling to room temperature
Glazing Program 2, (Total Time 96 Minutes):
In 38 minutes from room temperature to 790° C.
14 minutes of holding time at 790° C.
In 24 minutes from 790 to 900° C.
10 minutes of holding time at 910° C.
In 10 minutes from 910 to 800° C.
Quick cooling to room temperature
Glazing Program 3, (Production of Keatite Mixed Crystal Glass Ceramic):
In 33 minutes from room temperature to 790° C.
30 minutes of holding time at 790° C.
In 32 minutes from 790° C. to a maximum temperature $T_{max}$
7 minutes of holding time at $T_{max}$
Quick cooling to room temperature Tables 2 and 3 show the properties of the transparent glass ceramics with high-quartz mixed crystals as the prevailing crystal phase, which were produced with the glazing program 1 (Table 2) or 2 (Table 3). Examples 9 and 10 as well as 19 and 20 are comparison ceramics outside of the invention. The transmission measurements were made on polished plates with a thickness of 4 mm and with standard illuminant C, 2°. In addition to the color coordinates L*, a*, and b* in the CIELAB system, the color coordinates x and y in the CIE system are also cited. The glass ceramics according to the invention confirm the advantageous action of the Nd feedstock and optionally in addition Co for reducing the disruptive inherent color (Yellowness Index, variegation of colors C*). High values of the light transmission (brightness) Y are also achieved.

The turbidity was measured with standard illuminant C on 3.6 mm-thick plates that are polished on both sides and with a commercial haze-guard plus measuring device of the BYK-Gardner Company and characterized by the haze value.

Transparent glass ceramic plates that are 4 mm thick with polished surfaces were provided with a coating that consists of a high-temperature-stable silver-metallic-colored luster paint according to the prior art (DE 10014373 C2). The coating was baked on in an additional temperature treatment at 800° C. First, the color of the coating was directly measured with a measuring device of the Datacolor Company, designation Mercury 2000, in remission (incident light) with standard illuminant C, 2°. In the CIELAB system, the values are L*=78.5, a*=1.7, and b*=9.6, and the variegation of colors is C*=9.7. The measurements were now performed with this device, such that the color of the coating through the transparent glass ceramic plate was determined. The light irradiates the transparent glass ceramic plate, is partially absorbed and reflected on the colored bottom coating before it then passes again through the glass ceramic plate and reaches the observer. The disruptive influence of the inherent color of the transparent glass ceramic plate is produced during the measurement by altering the L*, a*, and b* values compared to the values measured directly on the coating. The measurements (Tables 2 and 3) confirm the advantageous action of the color-free, transparent glass ceramic plates according to the invention.

For the glazing program 1, in addition property values of the glass ceramics, such as infrared transmission at 1600 mm, thermal expansion between 20 and 700° C., density and the phase content of the main crystal phase that is measured with x-ray diffraction, that consist of high-quartz mixed crystals, as well as the mean crystallite size, are also indicated.

For the glazing programs with total times of 147 minutes and 96 minutes, low degrees of turbidity (haze values) are achieved by the selection of the nucleating agents.

In addition, some examples were converted with the glazing program 3 into translucent glass ceramics with keatite mixed crystals as a prevailing crystal phase and properties were determined (Table 4). The maximum temperatures $T_{max}$ during production are indicated in the table. Light transmission Y and the IR transmission at 1600 nm were measured on 3.6 mm-thick plates. The color values L*, a* and b* were determined in remission (incident light) on 3.6 mm thick polished plates with the measuring device Mercury 2000, standard illuminant C, 2°. The haze values of the examples (polished plates, 3.6 mm thickness) are more than 90%.

BRIEF DESCRIPTION OF DRAWINGS

FIG. 1 shows the transmission spectra of the glass ceramic of Example 8 according to the invention and the comparison glass ceramic of Example 9. The comparison example shows the disruptive coloring associated with a high Yellowness Index and chromaticity. The glass ceramic according to the invention shows the characteristic absorption bands of the Nd ion, which are extremely well suited also for labeling the glass ceramic plates according to the invention. Moreover, they also simplify the recycling of the glass ceramic by optical cullet separation processes based on the absorption bands and the infrared fluorescence of the Nd ion.

FIG. 2 shows the color coordinates of the glass ceramics according to the invention, Examples 11 to 18, and the comparison glass ceramics, Examples 19 and 20, in the CIELAB system.

TABLE 1

Figure 1:
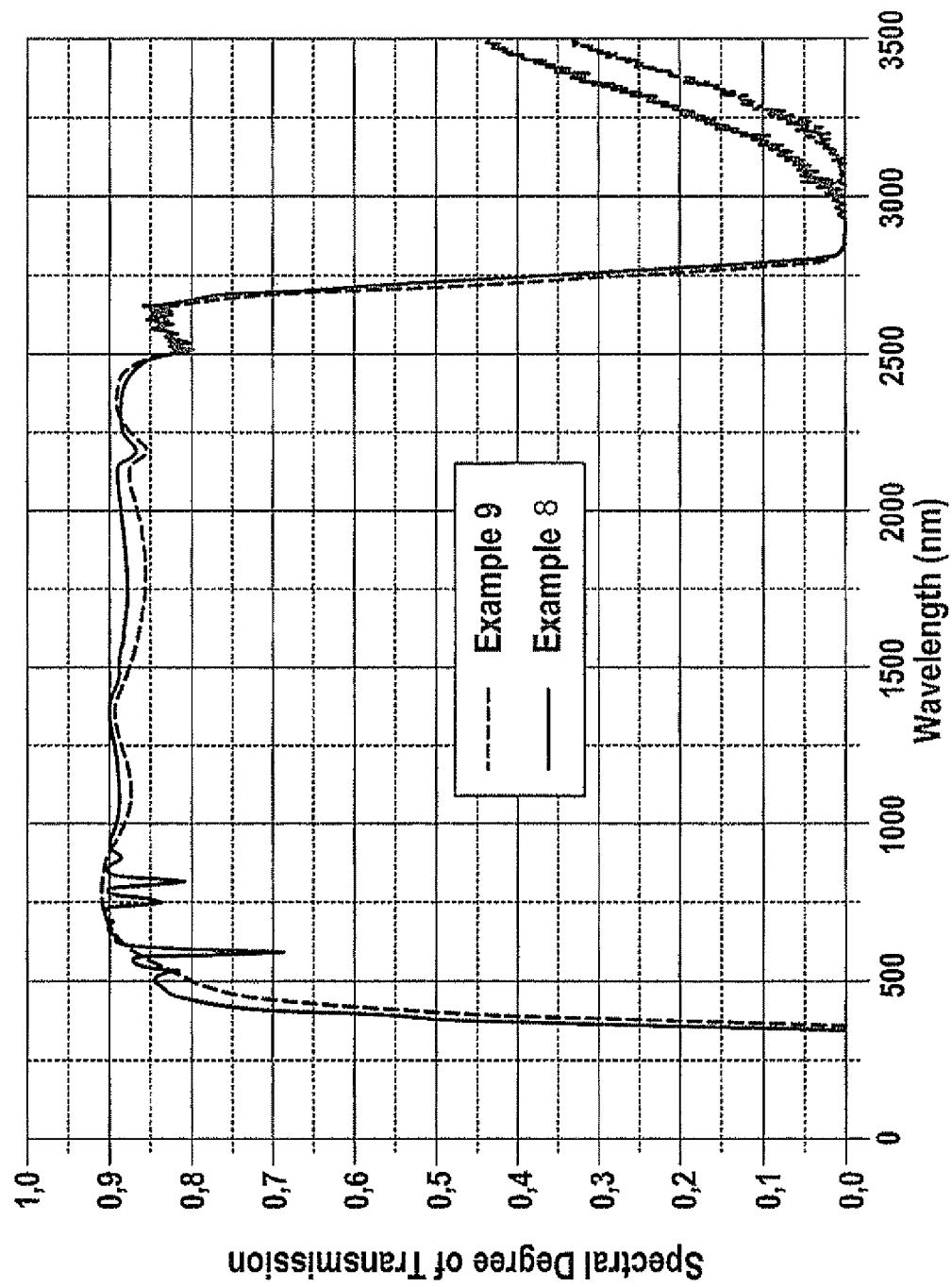
FIG. 1 illustrates Transmission Spectra of the Glass Ceramic of Example 8 and the Comparison Glass Ceramic of Example 9, (4 mm Thickness)
Figure 2:
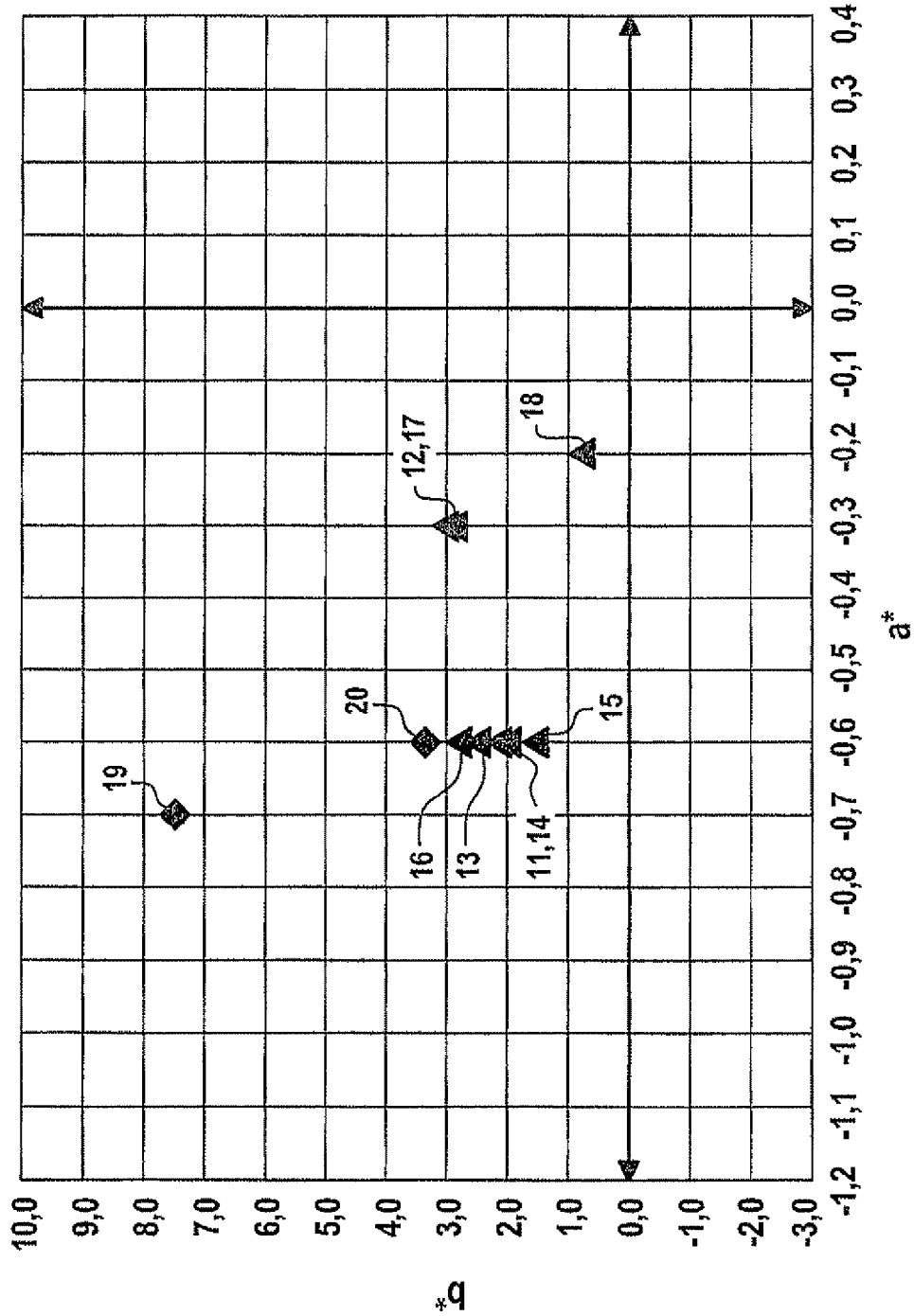
FIG. 2 illustrates Color Coordinates of the Glass Ceramics, Examples 11 to 18, and the Comparison Glass Ceramics of Examples 19 and 20 in the CIELAB Color System.

Compositions and Properties of Starting Glasses According to the Invention and Comparison Glasses 9 and 10

| Compositions in % by Weight Based on Oxide | | 1 | 2 | 3 | 4 | 5 | 6 | 7 | 8 | 9 | 10 |
|---|---|---|---|---|---|---|---|---|---|---|---|
| Al2O3 | | 21.3 | 21.3 | 21.8 | 21.65 | 20.0 | 19.95 | 20.1 | 20.0 | 19.9 | 22.0 |
| BaO | | — | — | 1.98 | 1.95 | 0.80 | 0.84 | 0.82 | 1.21 | 0.9 | 1.4 |
| K2O | | 0.13 | 0.11 | — | — | 0.20 | 0.20 | 0.20 | — | 0.22 | 0.27 |
| Li2O | | 3.75 | 3.70 | 3.69 | 3.64 | 3.54 | 3.75 | 3.65 | 3.63 | 3.6 | 4.15 |
| MgO | | 0.85 | 1.05 | 0.58 | 0.59 | 1.15 | 1.06 | 1.10 | 0.77 | 1.2 | — |
| Na2O | | 0.35 | 0.36 | 0.52 | 0.50 | 0.15 | 0.16 | 0.15 | 0.45 | 0.20 | 0.40 |
| P2O5 | | — | — | — | — | — | — | — | — | — | 1.33 |
| SiO2 | | 67.55 | 67.35 | 65.3 | 65.2 | 68.1 | 67.35 | 67.4 | 67.22 | 67.2 | 65.5 |
| ZnO | | 1.57 | 2.0 | 1.70 | 1.57 | 1.48 | 1.60 | 1.54 | 1.57 | 1.55 | — |
| SnO2 | | — | 0.11 | — | — | — | — | — | — | — | — |
| TiO2 | | 2.23 | 2.19 | 2.29 | 2.38 | 2.26 | 2.35 | 2.35 | 2.33 | 2.59 | 2.13 |
| ZrO2 | | 1.76 | 1.80 | 1.76 | 1.98 | 1.76 | 1.80 | 1.76 | 1.77 | 1.75 | 2.26 |
| As2O3 | | 0.40 | — | 0.28 | 0.43 | 0.40 | 0.86 | 0.85 | 0.86 | 0.86 | 0.44 |
| Sb2O3 | | — | — | — | — | — | — | — | — | — | 0.10 |
| Nd2O3 | | 0.09 | 0.02 | 0.08 | 0.09 | 0.14 | 0.06 | 0.06 | 0.17 | — | — |
| Fe2O3 | ppm | 200 | 100 | 180 | 200 | 200 | 140 | 150 | 160 | 290 | 220 |
| CoO | ppm | — | — | — | — | — | — | — | 5 | — | — |
| NiO | ppm | — | — | — | — | — | — | 23 | — | — | — |
| Tg | °C. | 681 | 685 | 6.76 | 687 | 692 | 669 | 682 | 672 | 673 | 710 |
| $V_A$ | °C. | 1320 | 1320 | 1306 | — | 1335 | 1315 | — | 1325 | 1304 | 1340 |
| OEG | °C. | 1240 | 1270 | 1250 | — | 1255 | 1280 | — | 1265 | 1265 | 1315 |
| $\alpha_{20/300}$ | $10^{-6}$/K | 3.87 | 3.88 | 4.08 | 4.05 | 3.79 | 3.90 | 3.90 | 3.91 | 3.87 | 4.24 |
| Density | g/cm³ | 2.436 | 2.446 | 2.472 | 2.479 | 2.444 | 2.451 | 2.450 | 2.447 | 2.454 | 2.431 |

TABLE 2

Properties of Glass Ceramics According to the Invention and Comparison Glass Ceramics of Examples 9 and 10 (Glazing Program 1)

| | | Example No. | | | | | | | | | |
|---|---|---|---|---|---|---|---|---|---|---|---|
| | | 1 | 2 | 3 | 4 | 5 | 6 | 7 | 8 | 9 | 10 |
| | | Glass No. | | | | | | | | | |
| | | 1 | 2 | 3 | 4 | 5 | 6 | 7 | 8 | 9 | 10 |
| Transmission Standard Illuminant C., 2° | 4 mm Thickness % | | | | | | | | | | |
| Light Transmission Y | | 87.0 | 87.3 | 87.7 | 86.3 | 85.6 | 87.2 | 85.6 | 83.8 | 84.8 | 89.4 |
| Yellowness Index | | 3.3 | 5.4 | 3.5 | 4.0 | 2.8 | 5.8 | 6.3 | 2.1 | 15.0 | 5.9 |
| X | | 0.3126 | 0.3148 | 0.3128 | 0.3133 | 0.3121 | 0.3150 | 0.3156 | 0.3117 | 0.3239 | 0.3151 |
| Y | | 0.3197 | 0.3215 | 0.3199 | 0.3206 | 0.3195 | 0.3222 | 0.3223 | 0.3183 | 0.3319 | 0.3224 |
| L* | | 94.6 | 94.8 | 94.9 | 94.3 | 94.0 | 94.7 | 94.1 | 93.3 | 93.6 | 95.6 |
| a* | | −0.5 | −0.3 | −0.4 | −0.6 | −0.6 | −0.5 | −0.3 | −0.2 | −0.7 | −0.5 |
| b* | | 1.8 | 2.8 | 1.9 | 2.2 | 1.6 | 3.1 | 3.2 | 1.1 | 8.1 | 3.2 |
| C* | | 1.8 | 2.8 | 1.9 | 2.2 | 1.7 | 3.1 | 3.2 | 1.1 | 8.1 | 3.2 |

TABLE 2-continued

Properties of Glass Ceramics According to the Invention and Comparison
Glass Ceramics of Examples 9 and 10 (Glazing Program 1)

| | | Example No. | | | | | | | | | |
|---|---|---|---|---|---|---|---|---|---|---|---|
| | | 1 | 2 | 3 | 4 | 5 | 6 | 7 | 8 | 9 | 10 |
| | | | | | | Glass No. | | | | | |
| | | 1 | 2 | 3 | 4 | 5 | 6 | 7 | 8 | 9 | 10 |
| IR Transmission 1600 nm | 4 mm Thickness % | 87.7 | 89.5 | 89.1 | 87.9 | 87.7 | 69.0 | 87.9 | 88.3 | 85.7 | 86.7 |
| Color of Bottom Coating Measured through Glass Ceramic (Remission) | 4 mm Thickness % | | | | | | | | | | |
| L* | | 76.71 | 76.65 | 75.88 | 76.29 | 75.68 | 76.59 | 75.85 | 74.63 | 74.90 | 77.48 |
| a* | | 1.21 | 1.84 | 1.49 | 1.26 | 1.19 | 1.32 | 1.99 | 1.71 | 1.68 | 1.23 |
| b* | | 10.49 | 11.98 | 11.40 | 11.06 | 10.25 | 12.42 | 12.29 | 9.50 | 18.69 | 12.83 |
| c* | | 10.56 | 12.12 | 11.49 | 11.13 | 10.32 | 12.49 | 12.45 | 9.66 | 18.76 | 12.89 |
| $\alpha_{20/700}$ | $10^{-6}$/K | −0.26 | −0.05 | −0.10 | +0.03 | +0.11 | −0.07 | +0.10 | −0.05 | +0.14 | −0.46 |
| Density | g/cm$^3$ | 2.519 | 2.526 | 2.545 | −2.550 | 2.534 | 2.543 | 2.538 | 2.544 | 2.546 | 2.509 |
| X-Ray Diffraction: | | | | | | | | | | | |
| High-Quartz Phase Content | % | 73 | 72 | 71 | 68 | 71 | 76 | 72 | 71 | 75 | 75 |
| Crystallite Size | nm | 33 | 32 | 40 | 37 | 28 | 40 | 30 | 33 | 41 | 38 |
| Turbidity Haze | 3.6 mm Thickness % | 0.28 | 0.28 | 0.50 | 0.42 | 0.27 | 0.23 | 0.25 | 0.32 | 0.20 | 0.27 |

TABLE 3

Properties of Glass Ceramics According to the Invention and Comparison
Glass Ceramics of Examples 19 and 20 (Glazing Program 2)

| | | Example No. | | | | | | | | | |
|---|---|---|---|---|---|---|---|---|---|---|---|
| | | 11 | 12 | 13 | 14 | 15 | 16 | 17 | 18 | 19 | 20 |
| | | | | | | Glass No. | | | | | |
| | | 1 | 2 | 3 | 4 | 5 | 6 | 7 | 8 | 9 | 10 |
| Transmission Standard Illuminant C., 2° | 4 mm Thickness % | | | | | | | | | | |
| Light Transmission Y | | 86.5 | 86.6 | 86.8 | 86.1 | 85.6 | 87.6 | 85.1 | 84.0 | 85.4 | 89.4 |
| Yellowness Index | | 4.1 | 5.8 | 4.9 | 3.9 | 2.8 | 5.4 | 6.1 | 1.6 | 13.8 | 6.2 |
| X | | 0.3133 | 0.3152 | 0.3141 | 0.3131 | 0.3121 | 0.3146 | 0.3154 | 0.3112 | 0.3228 | 0.3153 |
| Y | | 0.3207 | 0.3220 | 0.3214 | 0.3204 | 0.3195 | 0.3220 | 0.3222 | 0.3178 | 0.307 | 0.3227 |
| L* | | 94.4 | 94.5 | 94.5 | 94.2 | 94.0 | 94.8 | 93.9 | 93.4 | 93.9 | 95.6 |
| a* | | −0.6 | −0.3 | −0.6 | −0.6 | −0.6 | −0.6 | −0.3 | −0.2 | −0.7 | −0.6 |
| b* | | 2.2 | 3.0 | 2.6 | 2.1 | 1.6 | 2.9 | 3.1 | 0.8 | 7.5 | 3.4 |
| C* | | 2.3 | 3.0 | 2.7 | 2.2 | 1.7 | 3.0 | 3.1 | 0.8 | 7.5 | 3.4 |
| Color of Bottom Coating Measured through Glass Ceramic (Remission) | 4 mm Thickness % | | | | | | | | | | |
| L* | | 76.37 | 76.58 | 75.93 | 76.63 | 75.94 | 76.08 | 75.53 | 74.98 | 74.92 | 77.61 |
| a* | | 1.33 | 1.73 | 1.35 | 1.12 | 1.13 | 1.73 | 1.89 | 1.73 | 1.80 | 1.24 |
| b* | | 11.34 | 12.34 | 11.75 | 10.85 | 10.14 | 12.31 | 12.37 | 9.07 | 18.67 | 12.99 |
| c* | | 11.40 | 12.46 | 11.83 | 10.91 | 10.20 | 12.37 | 12.51 | 9.24 | 18.76 | 13.05 |
| Turbidity Haze | 3.6 mm Thickness % | 0.31 | 0.34 | 0.65 | 0.52 | 0.27 | 0.28 | 0.39 | 0.29 | 0.27 | 0.41 |

TABLE 4

Properties After Conversion into Keatite Glass Ceramic, (Glazing Program 3)

| | | Example No. | | | | |
|---|---|---|---|---|---|---|
| | | 21 | 22 | 23 | 24 | 25 |
| | | | | Glass No. | | |
| | | 2 | 4 | 6 | 8 | 9 |
| Maximum Temperature $T_{max}$ | °C. | 1120 | 1100 | 1090 | 1090 | 1080 |
| Transmission Standard Illuminant C., 2° | 3.6 mm Thickness | | | | | |

TABLE 4-continued

Properties After Conversion into Keatite Glass Ceramic, (Glazing Program 3)

| | | Example No. | | | | |
|---|---|---|---|---|---|---|
| | | 21 | 22 | 23 | 24 | 25 |
| | | | | Glass No. | | |
| | | 2 | 4 | 6 | 8 | 9 |
| Light Transmission Y | % | 9.0 | 6.4 | 4.5 | 5.0 | 3.9 |
| IR Transmission 1600 nm | % | 79.9 | 68.3 | 49.8 | 58.6 | 56.1 |
| Color (Remission) | 3.6 mm Thickness % | | | | | |
| L* | | 84.51 | 87.79 | 90.91 | 87.22 | 87.32 |
| a* | | −3.29 | −2.73 | −1.71 | −1.52 | −1.02 |
| b* | | −6.23 | −6.30 | −2.98 | −7.56 | −2.36 |
| c* | | 7.04 | 6.87 | 3.44 | 7.71 | 2.57 |
| $\alpha_{20/700}$ | $10^{-6}$/K | +0.91 | +1.26 | +1.00 | +1.02 | +1.05 |
| Density | g/cm$^3$ | 2.515 | 2.544 | 2.513 | 2.522 | 2.516 |
| X-Ray Diffraction: | | | | | | |
| Keatite Phase Content | % | 88 | 83 | 86 | 85 | 89 |
| Keatite Crystallite Size | nm | n.d. | >120 | 99 | >120 | — |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. EP 06 005 598.5, filed Mar. 20, 2007, is incorporated by reference herein.

The preceding examples can be repeated with similar success by substituting the generically or specifically described reactants and/or operating conditions of this invention for those used in the preceding examples. From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method for preparing a transparent, colorless lithium-aluminosilicate glass ceramic plate with high-quartz mixed crystals as the prevailing crystal phase, which is provided on one side with an opaque, colored, temperature-stable coating over the entire surface or over the entire surface to a large extent, having a Yellowness Index of less than 10% with a 4 mm thickness, and a variegation of colors of the glass ceramic in the CIELAB color system of C* of less than 5, comprising preparing a composition which preparation includes the addition of 0.01 to 0.4% by weight of $Nd_2O_3$ and 0.00001 to 0.004% by weight of CoO based on oxide resulting in a composition as follows in % by weight based on oxide:

| | |
|---|---|
| $Li_2O$ | 3.0-4.5 |
| $Na_2O$ | 0-1.5 |
| $K_2O$ | 0-1.5 |
| $\Sigma Na_2O + K_2O$ | 0.2-2.0 |
| MgO | 0-2.0 |

-continued

| | |
|---|---|
| CaO | 0-1.5 |
| SrO | 0-1.5 |
| BaO | 0-2.5 |
| ZnO | 0-2.5 |
| $B_2O_3$ | 0-1.0 |
| $Al_2O_3$ | 19-25 |
| $SiO_2$ | 55-69 |
| $TiO_2$ | 1-3 |
| $ZrO_2$ | 1-2.5 |
| $SnO_2$ | >0-0.4 |
| $\Sigma SnO_2 + TiO_2$ | <3 |
| $P_2O_5$ | 0-3.0 |
| $Nd_2O_3$ | 0.01-0.4 |
| CoO | 0.00001-0.004 | and one or more chemical refining agents or refining additives in a total content of up to 2.0% by weight, wherein $SnO_2$ is a refining agent and said refining is a high-temperature refining >1700° C., and wherein $As_2O_3$ is excluded, wherein the content of $ZrO_2+0.87$ ($TiO_2+SnO_2$) is 3.65 to 4.3% by weight, to result in said transparent, colorless lithium-aluminosilicate glass ceramic plate.

2. A method according to claim 1, wherein the composition (in % by weight based on oxide) is as follows:

| | |
|---|---|
| $Li_2O$ | 3.2-4.3 |
| $Na_2O$ | 0.2-1.0 |
| $K_2O$ | 0-0.8 |
| $\Sigma Na_2O + K_2O$ | 0.3-1.5 |
| MgO | 0.1-1.5 |
| CaO | 0-1.0 |
| SrO | 0-1.0 |
| BaO | 0-2.5 |
| ZnO | 0-2.0 |
| $Al_2O_3$ | 19-24 |
| $SiO_2$ | 60-68 |
| $TiO_2$ | 1.0-2.7 |
| $ZrO_2$ | 1.2-2.2 |
| $SnO_2$ | >0-0.3 |
| $\Sigma SnO_2 + TiO_2$ | <2.7 |
| $P_2O_5$ | 0-3.0 |
| $Nd_2O_3$ | 0.02-0.3 |
| CoO | 0.00001-0.003 | and one or more chemical refining agents or refining additives in a total content of up to 1.5% by weight.

3. A method according to claim 1, wherein the glass ceramic plate has a content of less than 2.5% by weight of $TiO_2$, less than 2000 ppm of $Nd_2O_3$, less than 400 ppm of $Fe_2O_3$, a light transmittance of more than 80% and a Yellowness Index of less than 7, in each case with a 4 mm layer thickness as well as a variegation of colors of C* of less than 3.5 in the CIELAB color system.

4. A method according to claim 1, wherein the chemical refining agents are selected from the group consisting of $Sb_2O_3$, and $CeO_2$ and the refining additives are selected from the group consisting of sulfate compounds, chloride compounds, and fluoride compounds.

5. A method according to claim 1, wherein the glass ceramic plate has less than 210 ppm of $Fe_2O_3$, or a light transmittance of more than 85%.

6. A method according to claim 1, wherein the glass ceramic plate has less than 300 ppm of $Fe_2O_3$.

7. A method according to claim 1, wherein 0.1-0.4% by weight of $SnO_2$ is present as a refining agent.

8. A method according to claim 2, wherein 0.1-0.4% by weight of $SnO_2$ is present as a refining agent.

* * * * *